United States Patent [19]

Sasano et al.

[11] Patent Number: 5,847,757
[45] Date of Patent: Dec. 8, 1998

[54] METHOD OF DRIVING SOLID-STATE IMAGE SENSING DEVICE

[75] Inventors: Nobusuke Sasano, Tokyo-To; Kenichi Arakawa, Yokohama; Tomoaki Iizuka, Yokohama; Miho Kobayashi, Yokohama; Hideki Motoyama, Chigasaki; Tetsuo Yamada, Yokohama, all of Japan

[73] Assignee: Kabushiki Kaisha Toshiba, Kawasaki, Japan

[21] Appl. No.: 605,805

[22] Filed: Feb. 23, 1996

Related U.S. Application Data

[63] Continuation of Ser. No. 294,837, Aug. 29, 1994, abandoned.

[30] Foreign Application Priority Data

Aug. 30, 1993 [JP] Japan ................................. 5-213844

[51] Int. Cl.⁶ ............................................... H04N 3/14
[52] U.S. Cl. ........................................ 348/316; 348/318
[58] Field of Search ................................ 348/312, 316, 348/317, 318

[56] References Cited

U.S. PATENT DOCUMENTS

| | | | |
|---|---|---|---|
| 4,897,728 | 1/1990 | Yamada | 348/318 |
| 5,025,318 | 6/1991 | Nagura | 348/316 |
| 5,148,013 | 9/1992 | Yamada | 348/316 X |
| 5,500,675 | 3/1996 | Arakawa et al. | 348/318 |

*Primary Examiner*—Wendy Garber
*Attorney, Agent, or Firm*—Finnegan, Henderson, Farabow, Garrett & Dunner, L.L.P.

[57] ABSTRACT

A driving method for a solid-state image sensing device includes the steps of: transferring signal charges generated at pixels (12) arranged in odd rows in the column upward direction through vertical transfer paths (13) each arranged for each column; temporarily accumulating the upward transferred signal charges for one field at a first accumulation region (14) and transferring the accumulated signal charges row by row in sequence for each field period through other vertical transfer paths (18) to a first horizontal path (16); transferring the upward transferred signal charges in the horizontal row direction row by row through the first horizontal transfer path (16); transferring signal charges generated at pixels (12) arranged in even rows in the column downward direction through the same vertical transfer paths (13); temporarily accumulating the downward transferred signal charges for one field at a second accumulation region (15) and transferring the accumulated signal charges row by row in sequence for each field period through other vertical transfer paths (19) to a second horizontal path (17); and transferring the downward transferred signal charges in the horizontal row direction row by row through the second horizontal transfer path (17) at a timing different (e.g., one cycle later) from that of the signal charge transfer through the first horizontal transfer path (16). The driving method enables both the interlaces and non-interlaced scanning without use of any external memory.

6 Claims, 4 Drawing Sheets

INTERLACED SCANNING

NON-INTERLACED SCANNING

5,847,757

METHOD OF DRIVING SOLID-STATE IMAGE SENSING DEVICE

This application is a continuation of application Ser. No. 08/294,/837, Aug. 29, 1994, now abandoned.

BACKGROUND OF THE INVENTION

The present invention relates to a method of driving a solid-state image sensing device.

The structure of the solid-state image sensing device will be described hereinbelow with reference to the attached drawings. As shown in FIG. 3, an ordinary solidstate image sensing device is roughly composed of a photosensitive region 11, a first accumulation region 14, a second accumulation region 15, and two horizontal charge transfer paths 16 and 17.

In the photosensitive region 11, pixels 12 are arranged in two dimensions. Each pixel 12 transforms light incident thereupon into a signal charge photoelectrically, and accumulates the transformed signal charge thereat. Further, a vertical charge transfer path 13 is arranged for each column of these pixels 12 to transfer the signal charges along the column direction. Here, the signal charges are transferred in the upward or downward direction through each of the vertical charge transfer paths 13.

At the upper and lower ends of the photosensitive region 11, the first accumulation region 14 and the second accumulation region 15 are provided, respectively. These first and second accumulation regions 14 and 15 can temporarily accumulate the signal charges for one field, respectively, while transferring the accumulated signal charges in sequence in the column direction. That is, in the first accumulation region 14, a vertical charge transfer path 18 is provided for each column to transfer the accumulated signal charges in the upward direction in sequence. Further, in the second accumulation region 15, another vertical charge transfer path 19 is provided for each column to transfer the accumulated signal charges in the downward direction. Further, in the first accumulation region 14, the transfer path 18 is provided with a cyclic transfer path through which the sequence of the accumulated signal charges can be replaced.

At the ends of the first and second accumulation regions 14 and 15, two horizontal charge transfer paths 16 and 17 are provided to transfer the accumulated signal charges in the row direction (in the horizontal direction in the drawing). Further, at each end of the horizontal charge transfer paths 16 and 17, a charge detecting circuit (not shown) is provided to detect the signal charges transferred in the horizontal direction.

In the solid-state image sensing device constructed as described above, a method of driving the device related to the present invention will be described hereinbelow. FIG. 4 shows the directions in which the signal charges are read and then transferred. The signal charges generated at and accumulated by the pixels 12 in the photosensitive region 11 are transferred through each of the charge transfer paths 13 in the column upward or downward direction alternately for each adjacent row line. In more detail, for instance, the signal charges at the pixels arranged in the odd rows are transferred in the downward direction, and the signal charges at the pixels arranged in the even rows are transferred in the upward direction, respectively all through the same vertical charge transfer paths 13 each arranged for each column.

Therefore, the signal charges transferred in the upward direction through the charge transfer paths 13 are given to the first accumulation region 14 and accumulated as the signal charges for one field; and the signal charges transferred in the downward direction through the charge transfer paths 13 are given to the second accumulation region 15 and accumulated as the signal charges for one field in the same way. Further, the signal charges of all the pixels 12 within the photosensitive region 11 are transferred row by row for each field period from the first and second accumulation regions 14 and 15 to the horizontal charge transfer paths 16 and 17, simultaneously and respectively. The signal charges transferred to the horizontal charge transfer paths 16 and 17 are further transferred in sequence in the horizontal direction, and read by the charge detecting circuits provided on both ends of the transfer paths 16 and 17, respectively.

Further, as shown in FIG. 4, transfer pulses H1A and H2A are applied to the horizontal transfer path 16; transfer pulses H1B and H2B are applied to the horizontal transfer path 17; and transferred signals OSA and OSB are output from the charge detecting circuits provided at the ends of the horizontal transfer paths 16 and 17, respectively.

FIG. 6 is a longitudinal cross-sectional view taken along a line A—A in FIG. 4, in which the transfer pulse H1A or H1B (or H2A or H2B) is applied to electrodes 21a (or 21b) formed in the horizontal charge transfer path 16 (or 17).

Further, FIG. 5 shows a timing chart of the transfer pulses H1A and H2A, H1B and H2B, the output signals OSA and OSB, and reset pulses RSA and RSB (used for resetting), respectively.

In this driving method, as shown by a timing chart shown in FIG. 2, the rise or fall timings of the upper side transfer pulses H1A, H2A and the output signal OSA are the same as the rise and fall timings of the lower side transfer pulses H1B, H2B and the output signal OSB, respectively. Therefore, the signal charges for each field have been read from the upper or lower horizontal charge transfer paths 16 and 17, simultaneously.

As understood with reference to FIG. 7, in the case of the interlaced scanning, since the signal charges are read simultaneously for each row, there exists no problem. In more detail, the signal charges for one field accumulated by the pixels 12 arranged in the odd rows are read from the upper horizontal charge transfer path 16, and simultaneously the signal charges for one field accumulated by the pixels 12 arranged in the even rows are read from the lower horizontal charge transfer path 17.

In the case of the non-interlaced scanning as shown in FIG. 8, however, after the signal charges of the pixels arranged in odd rows have been read from the upper horizontal charge transfer path 16, the signal charges of the pixels arranged in even rows must read from the lower horizontal charge transfer path 17. Further, the read signal charges in the odd and even rows must be read out in sequence after these signal charges have been once stored in an external memory.

SUMMARY OF THE INVENTION

Accordingly, it is the object of the present invention to provide a method of driving the solid-state image sensing device, which enables the non-interlaced scanning without use of any external memory.

To achieve the above-mentioned object, the present invention provides a method of driving a solid-state image sensing device having: a photosensitive section having a photoelectric transfer element array formed by arranging a plurality of photoelectric transfer elements in row and column directions into a matrix pattern, for generating signal charges in response to light incident thereupon; and column direction charge transferring means each provided for each column of said photoelectric transfer elements, for transferring the signal charges generated by the photoelectric transfer elements arranged at the corresponding column in first and second directions; first accumulating means provided at one transfer end of said column direction charge transferring means, for receiving the signal charges transferred by said column direction charge transferring means in the first column direction at one end thereof and for accumulating the received signal charges temporarily by transferring the received signal charges in sequence in the first column direction; second accumulating means provided at the other transfer end of said column direction charge transferring means, for receiving the signal charges transferred by said column direction charge transferring means in the second column direction at the other end thereof and for accumulating the received signal charges temporarily by transferring the received signal charges in sequence in the second column direction; first row direction charge transferring means provided at the other end of said first accumulating means, for receiving the signal charges transferred in sequence by said first accumulating means and for transferring the received signal charges in the row direction; and second row direction charge transferring means provided at the other end of said second accumulating means, for receiving the signal charges transferred in sequence by said second accumulating means and for transferring the received signal charges in the row direction, which comprises the steps of: transferring the signal charges generated by said photoelectric transfer elements arranged in the odd rows in the first column direction by said corresponding column direction charge transferring means; accumulating the signal charges transferred by said column direction charge transferring means in the first column direction by said first accumulating means, while transferring the accumulated signal charges in the first column direction; transferring the signal charges accumulated at said first accumulating means in the row direction by said first row direction charge transferring means; transferring the signal charges generated by said photoelectric transfer elements arranged in the even rows in the second column direction by said corresponding column direction charge transferring means; accumulating the signal charges transferred by said column direction charge transferring means in the second column direction by said second accumulating means, while transferring the signal charges in the second column direction; transferring the signal charges accumulated at said second accumulating means in the row direction by said second row direction charge transferring means; and the transfer operation of said first row direction charge transferring means for transferring the signal charges for one row and the transfer operation of said second row direction charge transferring means for transferring the signal charges for one row being executed alternately at two different timings.

In the driving method according to the present invention, since the signal charges generated at the photoelectric transfer elements arranged in the odd rows and the signal charges generated at the photoelectric transfer elements arranged in the even rows are outputted row by row alternately at two different timings through the first and second row direction charge transfer means, the non-interlaced scanning is enabled without use of any external memory.

Further, it is preferable that at least one of said first accumulating means and said second accumulating means includes a cyclic transfer path for reversing column direction sequence of the signal charges when the signal charges are transferred in the column direction.

Further, when a drive pulse applied to said first row direction charge transferring means and another drive pulse applied to said second row direction charge transferring means are shifted by a half cycle from each other, it is possible to transfer the signal charges for one row through the first row direction charge transfer means and the signal charges for one row through the second row direction charge transfer means alternately at two different timings.

Further, the transfer operation of said first row direction charge transferring means for transferring the signal charges for one row and the transfer operation of said second row direction charge transferring means for transferring the signal charges for one row can be executed alternately at two different timings in the case of non-interlaced scanning and at the same timing in the case of interlaced scanning.

DETAILED DESCRIPTION OF THE EMBODIMENTS

An embodiment of the driving method for the solid-state image sensing device according to the present invention will be described in detail hereinbelow with reference to the attached drawings.

Figure 2:
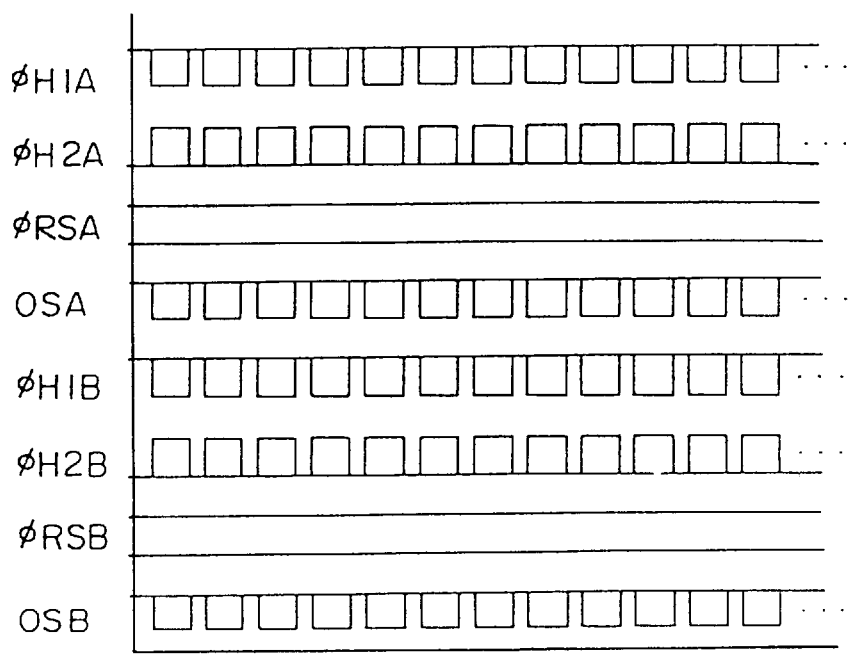
FIG. 2 is a timing chart showing the transfer pulses used for and the output signals from the driving method for the solid-state image sensing device related to the present invention.
Figure 3:
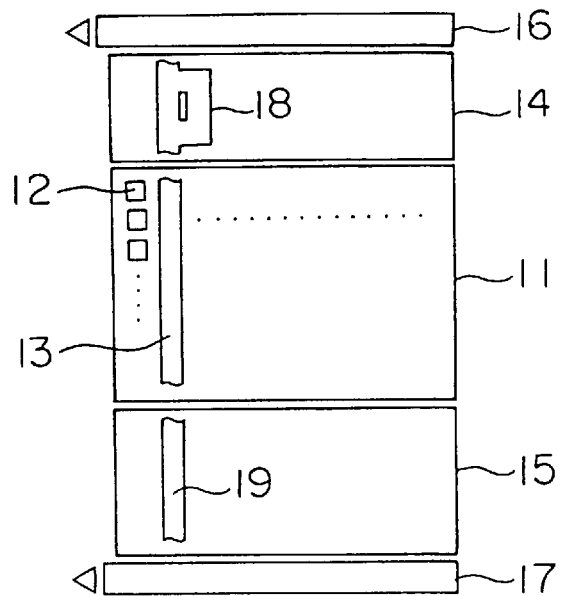
FIG. 3 is a block diagram showing the solid-state image sensing device, to which the driving method according to the present invention is applied.
Figure 4:
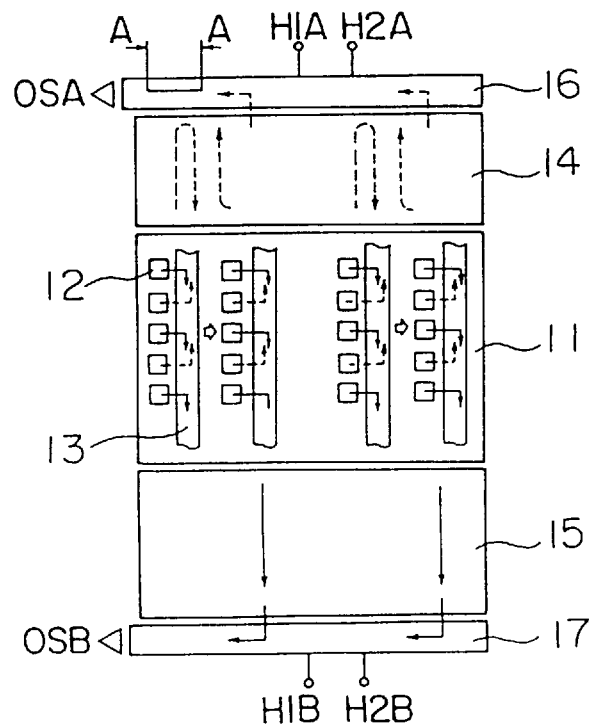
FIG. 4 is an illustration for assistance in explaining the transfer directions of the signal charges in the solid-state image sensing device shown in FIG. 3.
Figure 5:
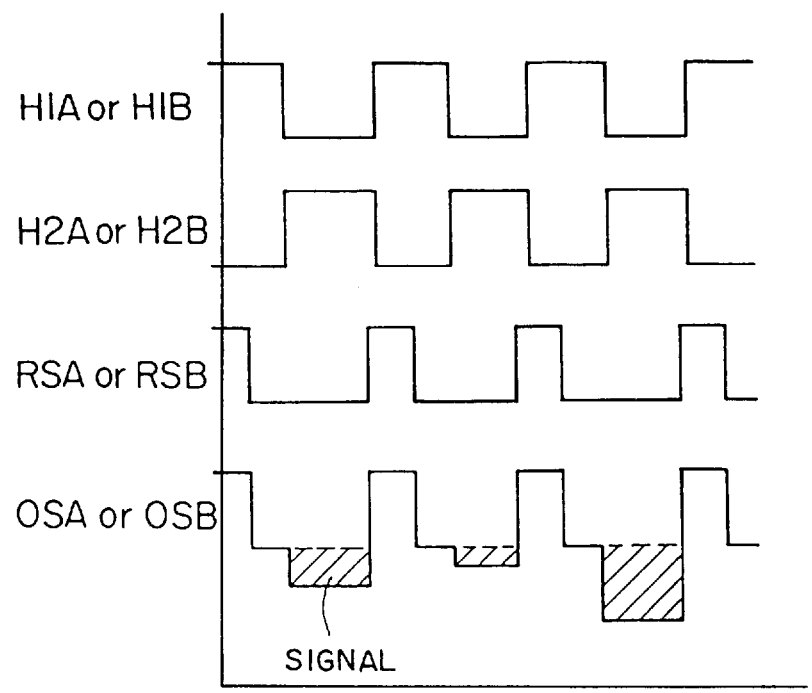
FIG. 5 is a timing chart showing the waveforms of the transfer pulses, the reset pulse applied to and the output signals from the solid-state image sensing device shown in FIG. 3.
Figure 6:
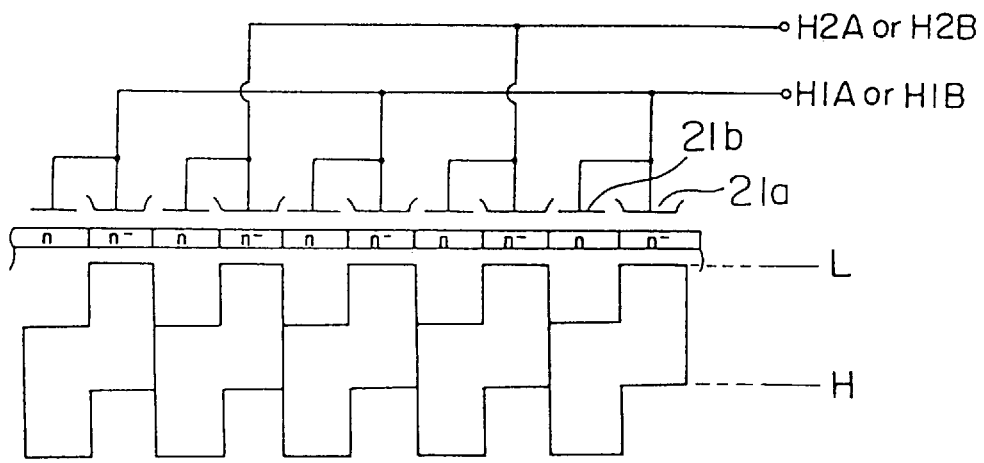
FIG. 6 is a longitudinal cross-sectional view showing the solid-state image sensing device, taken along the line A—A in FIG. 4.

In the afore-mentioned driving method, the driving pulses as shown in FIG. 2 are used. In more detail, the rise and fall timings of the transfer pulses H1A and H2A applied to the upper side horizontal charge transfer path 16 and the signal OSA output from the charge detecting circuit thereof are the same as the rise and fall timings of the transfer pulses H1B and H2B applied to the lower side horizontal charge transfer path 17 and the signal OSB output from the charge detecting circuit thereof. Accordingly, the signal charges for each field are read from the upper and lower horizontal charge transfer paths 16 and 17 simultaneously, with the result that an external memory is required additionally in the case of the non-interlaced scanning.

Figure 1:
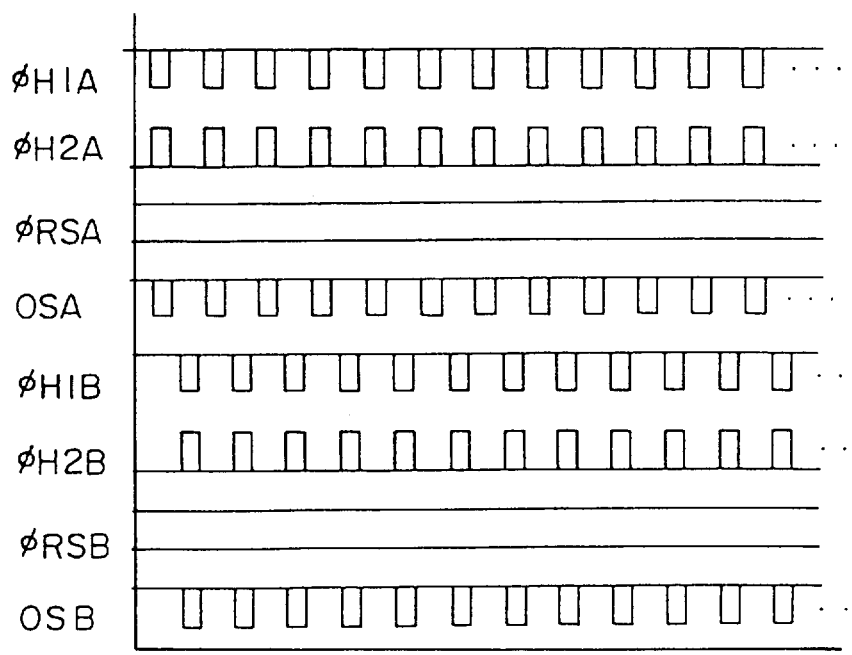
FIG. 1 is a timing chart showing the transfer pulses used for and the output signals from an embodiment of the driving method for the solid-state image sensing device according to the present invention.

In contrast with this, in the embodiment of the driving method for the solid-state image sensing device according to the present invention, the driving pulses as shown in FIG. 1 are used. As clearly understood, the frequency of the driving pulses of the present embodiment shown in FIG. 1 is twice higher than that of the driving pulses shown in FIG. 2. In addition, the rise and fall timings of the transfer pulses H1A and H2A applied to the upper horizontal charge transfer path 16 and the signal OSA output from the charge detecting circuit are a half cycle shifted or delayed from the rise and fall timings of the transfer pulses H1B and H2B applied to the lower horizontal charge transfer path 17 and the signal OSB output from the charge detecting circuit.

Figure 8:
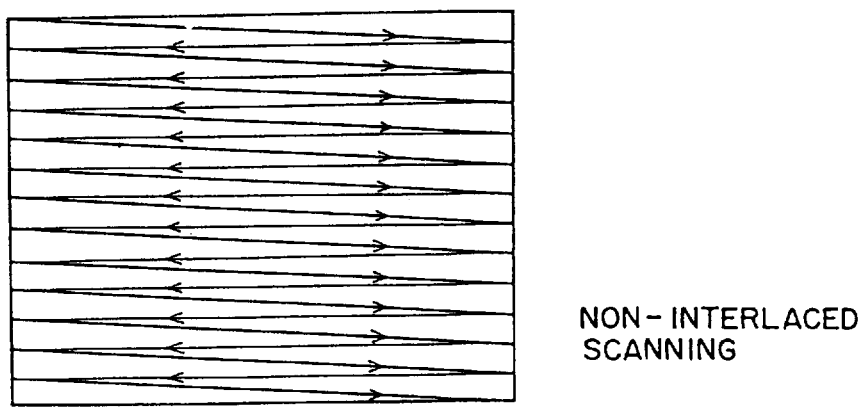
FIG. 8 is an illustration for assistance in explaining the scanning lines on a picture in the non-interlaced scanning.

Since the image sensing device of the present invention is driven on the basis of the driving pulses as described above, it is possible to output the signal charges in all the odd rows and the signal charges in all the even rows alternately row by row for each field period, from the two charge detecting circuits provided at the ends of the upper and lower horizontal charge transfer paths 16 and 17. Therefore, when the non-interlaced scanning as shown in FIG. 8 is required, an additional external memory is not necessary. As a result, the image sensing device can be reduced in size, and system configuration can be simplified, thus reducing the cost thereof.

Figure 7:
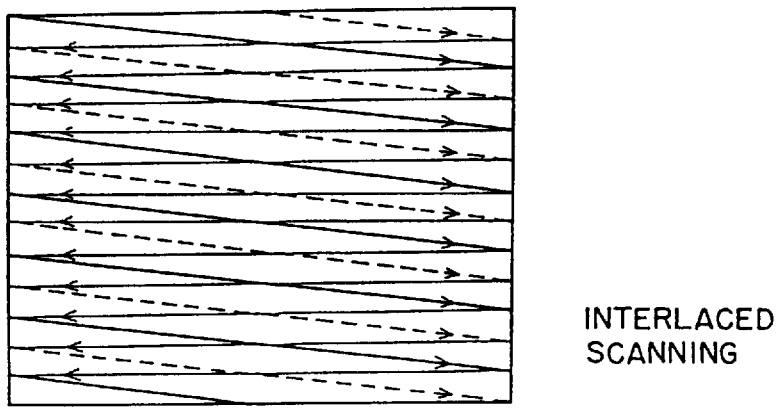
FIG. 7 is an illustration for assistance in explaining the scanning lines on a picture in the interlaced scanning.

Further, in the above-mentioned embodiment, it is possible to drive the interlaced scanning as shown in FIG. 7, by use of the transfer pulses as shown in FIG. 1. That is, the driving method of the present invention can be used for both the non-interlaced scanning and the interlaced scanning without use of any external memory.

Further, the above embodiment has been described by way of example, and therefore the present invention is not limited to only the above-mentioned embodiment. For instance, the timing chart of the transfer pulses shown in FIG. 1 is shown as an example. Therefore, the waveforms of the transfer pulses are not limited only to those shown in FIG. 1, as far as the driving pulses can output the charge signals generated at the pixels arranged in the odd rows and the charge signals generated at the pixels arranged in the even rows alternately row by row.

What is claimed is:

1. A method of driving a solid-state image sensing device, having:

a photosensitive section, having a photoelectric transfer element array formed by arranging a plurality of photoelectric transfer elements in row and column directions into a matrix pattern, for generating signal charges in response to light incident thereupon; and column direction charge transferring means, each provided for each column of said photoelectric transfer elements, for transferring the signal charges generated by the photoelectric transfer elements arranged at the corresponding column in first and second directions;

first accumulating means, provided at one transfer end of said column direction charge transferring means, for receiving the signal charges transferred by said column direction charge transferring means in the first column direction at one end thereof and for accumulating the received signal charges temporarily by transferring the received signal charges in sequence in the first column direction;

second accumulating means, provided at the other transfer end of said column direction charge transferring means, for receiving the signal charges transferred by said column direction charge transferring means in the second column direction at the other end thereof and for accumulating the received signal charges temporarily by transferring the received signal charges in sequence in the second column direction;

first row direction charge transferring means, provided at the other end of said first accumulating means, for receiving the signal charges transferred in sequence by said first accumulating means and for transferring the received signal charges in the row direction; and second row direction charge transferring means, provided at the other end of said second accumulating means, for receiving the signal charges transferred in sequence by said second accumulating means and for transferring the received signal charges in the row direction, which comprises the steps of:

transferring the signal charges generated by said photoelectric transfer elements arranged in odd rows in the first column direction by said corresponding column direction charge transferring means;

accumulating the signal charges transferred by said column direction charge transferring means in the first column direction by said first accumulating means, while transferring the accumulated signal charges in the first column direction;

transferring the signal charges accumulated at said first accumulating means in the row direction by said first row direction charge transferring means;

transferring the signal charges generated by said photoelectric transfer elements arranged in even rows in the second column direction by said corresponding column direction charge transferring means;

accumulating the signal charges transferred by said column direction charge transferring means in the second column direction by said second accumulating means, while transferring the accumulated signal charges in the second column direction; and transferring the signal charges accumulated at said second accumulating means in the row direction by said second row direction charge transferring means, wherein entire rows of signal charges are transferred at alternating timings by said first and second row direction charge transferring means.

2. The method of driving a solid-state image sensing device of claim 1, wherein at least one of said first accumulating means and said second accumulating means includes a cyclic transfer path for reversing column direction sequence of the signal charges when the signal charges are transferred in the column direction.

3. The method of driving a solid-state image sensing device of claim 1, wherein a drive pulse applied to said first row direction charge transferring means and anther drive pulse applied to said second row direction charge transferring means are shifted by a half cycle from each other.

4. A method of driving a solid-state image sensing device, having:

a photosensitive section, having a photoelectric transfer element array formed by arranging a plurality of photoelectric transfer elements in row and column directions into a matrix pattern, for generating signal charges in response to light incident thereupon; and column direction charge transferring means, each provided for each column of said photoelectric transfer elements, for transferring the signal charges generated by the photoelectric transfer elements arranged at the corresponding column in first and second directions;

first accumulating means provided at one transfer end of said column direction charge transferring means, for receiving the signal charges transferred by said column direction charge transferring means in the first column direction at one end thereof and for accumulating the received signal charges temporarily by transferring the received signal charges in sequence in the first column direction;

second accumulating means, provided at the other transfer end of said column direction charge transferring means, for receiving the signal charges transferred by said column direction charge transferring means in the second column direction at the other end thereof and for accumulating the received signal charges temporarily by transferring the received signal charges in sequence in the second column direction;

first row direction charge transferring means, provided at the other end of said first accumulating means, for receiving the signal charges transferred in sequence by said first accumulating means and for transferring the received signal charges in the row direction; and second row direction charge transferring means, provided at the other end of said second accumulating means, for receiving the signal charges transferred in sequence by said second accumulating means and for transferring the received signal charges in the row direction, which comprises the steps of:

transferring the signal charges generated by said photoelectric transfer elements arranged in odd rows in the first column direction by said corresponding column direction charge transferring means;

accumulating the signal charges transferred by said column direction charge transferring means in the first column direction by said first accumulating means, while transferring the accumulated signal charges in the first column direction;

transferring the signal charges accumulated at said first accumulating means in the row direction by said first row direction charge transferring means;

transferring the signal charges generated by said photoelectric transfer elements arranged in even rows in the second column direction by said corresponding column direction charge transferring means;

accumulating the signal charges transferred by said column direction charge transferring means in the second column direction by said second accumulating means, while transferring the accumulated signal charges in the second column direction; and transferring the signal charges accumulated at said second accumulating means in the row direction by said second row direction charge transferring means, wherein entire rows of signal charges are transferred at alternating timings by said first and second row direction charge transferring means in the case of non-interlaced scanning, and at the same timing in the case of interlaced scanning.

5. The method of driving a solid-state image sensing device of claim 4, wherein at least one of said first accumulating means and said second accumulating means includes a cyclic transfer path for reversing column direction sequence of the signal charges when the signal charges are transferred in the column direction.

6. The method of driving a solid-state image sensing device of claim 4, wherein a drive pulse applied to said first row direction charge transferring means and another drive pulse applied to said second row direction charge transferring means are shifted by a half cycle from each other in the case of the non-interlaced scanning, but the same in timing in the case of the interlaced scanning.

* * * * *

UNITED STATES PATENT AND TRADEMARK OFFICE
CERTIFICATE OF CORRECTION

PATENT NO. : 5,847,757
DATED : December 8, 1998
INVENTOR(S) : Sasano et al.

It is certified that error appears in the above-identified patent and that said Letters Patent is hereby corrected as shown below:

Claim 3, column 6, line 49, "anther" should read --another--.

Claim 4, column 6, line 64, after "means", insert --, --.

Signed and Sealed this

Twenty-third Day of November, 1999

Attest:

Q. TODD DICKINSON

Attesting Officer

Acting Commissioner of Patents and Trademarks